United States Patent
Kampf et al.

(10) Patent No.: US 6,749,049 B2
(45) Date of Patent: Jun. 15, 2004

(54) TORQUE LIMITING COUPLING

(75) Inventors: Klaus Kampf, Lohmar (DE); Norbert Fartmann, Siegburg (DE); Karl Coenen, Siegburg (DE)

(73) Assignee: GKN Walterscheid GmbH (DE)

( * ) Notice: Subject to any disclaimer, the term of this patent is extended or adjusted under 35 U.S.C. 154(b) by 0 days.

(21) Appl. No.: 10/243,902

(22) Filed: Sep. 13, 2002

(65) Prior Publication Data

US 2003/0054889 A1 Mar. 20, 2003

(30) Foreign Application Priority Data

Sep. 14, 2001 (DE) .......................... 101 45 430

(51) Int. Cl.$^7$ .................... F16D 43/206; F16D 15/00; A01B 61/00
(52) U.S. Cl. ................... 192/15; 192/17 R; 192/24; 192/56.57; 192/56.62; 192/114 R; 192/148; 192/150
(58) Field of Search .................. 192/17 R, 15, 192/24, 56.57, 56.62, 17 A, 17 C, 17 D, 27, 28, 33 R, 114 R, 148, 149, 150, 223.2

(56) References Cited

U.S. PATENT DOCUMENTS

| | | | |
|---|---|---|---|
| 2,644,560 A | * 7/1953 | Kleinschmidt | 192/27 |
| 3,405,790 A | 10/1968 | Orwin et al. | |
| 3,406,797 A | * 10/1968 | Toussaint | 192/27 |
| 4,075,873 A | * 2/1978 | Geisthoff | 192/56.57 |
| 4,460,077 A | * 7/1984 | Geisthoff | 192/24 |
| 4,538,715 A | * 9/1985 | Konrad et al. | 192/56.57 |
| 5,076,407 A | 12/1991 | Mikeska et al. | 192/28 |
| 5,868,231 A | * 2/1999 | Kampf | 192/56.62 |

FOREIGN PATENT DOCUMENTS

| | | |
|---|---|---|
| DE | 30 34 606 | 3/1982 |
| DE | 33 44 043 A1 | 6/1985 |
| DE | 34 38 374 C1 | 1/1986 |
| DE | 35 28 591 C2 | 10/1988 |

* cited by examiner

Primary Examiner—Rodney H. Bonck
(74) Attorney, Agent, or Firm—Harness, Dickey & Pierce, P.L.C.

(57) ABSTRACT

A torque limiting coupling defines a longitudinal axis (17) and has a coupling hub (8) with circumferentially distributed through holes. Transfer elements are adjustably held in the holes. A coupling sleeve (6) has first recesses corresponding to the through holes. A switching disk (9) is arranged relative to the coupling hub (8) between a torque transmitting position and a freewheeling position. The switching disk (9) is urged towards the torque transmitting position. This urges the transfer elements in the direction towards the coupling hub (8). The transfer elements engage, for torque transmission, in recesses of the coupling sleeve (6). Coupling sleeve (6), when a predetermined nominal torque is exceeded, is transferable from the torque transmitting position to the freewheeling position. Second recesses, corresponding to the through holes, receive the transfer elements in the freewheeling position. A locking pawl (14), in a retaining position, interacts at least with one switching face (11) of the switching disk (9). The switching disk (9) is transferable from the torque transmitting position into the freewheeling position. In the retaining position, the locking pawl interacts with a first retaining face (19) of the coupling hub (8) so that the torque limiting coupling (1) is retained against rotation.

3 Claims, 4 Drawing Sheets

TORQUE LIMITING COUPLING

CROSS-REFERENCE TO RELATED APPLICATIONS

This application claims priority to German Patent Application No. 10145430.9 filed Sep. 14, 2001, which application is herein expressly incorporated by reference.

FIELD OF THE INVENTION

The invention relates to a torque limiting coupling, especially, in a drive transmission unit of agricultural implements. Torque limiting couplings prevent damage or destruction of agricultural implement due to overloading. The torque limiting coupling separates the driving side from the agricultural implements when the torque necessary to drive the agricultural implement exceeds a threshold value and may lead to damage of the implement. This may occur when the agricultural implement is blocked.

BACKGROUND OF THE INVENTION

DE 30 34 606 A1 illustrates a torque limiting coupling with a coupling hub and a coupling sleeve. The coupling hub and sleeve are rotatably arranged around a longitudinal axis. The coupling hub has through holes which adjustably hold transfer elements parallel to the longitudinal axis. The transfer elements engage, in a torque transmitting position, recesses corresponding to the through holes. A switching disk is acted upon axially by a spring and is supported on the transfer elements. Thus, the transfer elements are held in the recesses. When a predetermined torque is exceeded, the transfer elements are pushed axially against the spring force of the spring out of the recesses. The transfer elements roll off on a side face of the coupling sleeve and turn the switching disk into a position where the transfer elements engage in recesses of the switching disk. In this position the coupling hub is drivingly separated from the coupling sleeve. Thus, torque can not be transmitted between the coupling hub and the coupling sleeve. Furthermore, a switching cam projects radially outwardly from the external circumference of the switching disk. A switching ram is adjustably arranged between a release position and a retaining position. In the retaining position the switching ram interacts with the switching cam. Accordingly, when the torque limiting coupling rotates, the switching disk transfers to its freewheeling position. Thus, torque transmission is interrupted. A return cam on the coupling nose of the switching ram is moved back into a release position after rotation of the switching disk. A disadvantage of this embodiment is, that, when switching off the torque limiting coupling the driven masses of the agricultural implement are lagging. Retention of the driven masses of the agricultural implement need to be achieved by a separate unit.

SUMMARY OF THE INVENTION

It is an object of the present invention to provide a torque limiting coupling that interrupts the torque transmission when an overload occurs, and stops the driven masses.

The object is achieved by a torque limiting coupling including a longitudinal axis around which the torque limiting coupling is rotatably arranged. A coupling hub has through holes distributed around its circumference. Transfer elements are adjustably held parallel to the longitudinal axis in the through holes. A coupling sleeve drives the coupling hub in one rotational driving direction. The coupling sleeve has first recesses corresponding to the through holes.

A switching disk is rotatably arranged between a torque transmitting position and a freewheeling position relative to the coupling hub. The switching disk is acted upon by a spring acting in the circumferential direction to the torque transmitting position. The switching disk urges, via an axially acting spring force, the transfer elements in the direction towards the coupling hub. The transfer elements engage the recesses of the coupling sleeve for torque transmission. The transfer elements disk roll off the switch disk when a predetermined nominal torque is exceeded. Thus, the transfer elements move from the torque transmitting position to the freewheeling position. The switch disk has second recesses corresponding to the through holes. The transfer elements engage the second recesses in the freewheeling position.

A locking pawl is movable between a release position and a retaining position. The locking pawl interacts with a radial selector face on the circumference of the switching disk in the retaining position. Accordingly, the switching disk can be transferred from the torque transmitting position to the freewheeling position. The locking pawl interacts with a radially extending first retaining face of the coupling hub in the retaining position. Accordingly, the coupling hub is retained (held) against rotation around the longitudinal axis in the rotational driving direction. The locking pawl has a mechanism that interacts with the coupling hub in the retaining position of the locking pawl. Here, the coupling hub is retained against rotation opposite to the rotational driving direction.

Therefore, the torque limiting coupling according to the invention serves two functions. The first function is separation of the coupling hub from the coupling sleeve when an overload occurs. Thus, torque is not transmitted between the coupling hub and the coupling sleeve. Here, the torque limiting coupling is designed so that when the relative rotational speed between the coupling hub and the coupling sleeve is reduced, the switching disk is moved back to the torque transmitting position due to the spring acting in a circumferential direction. Accordingly, the torque limiting coupling can only be switched on by reducing the torque. Without torque reduction the torque limiting coupling has to be manually adjusted.

The second function is switching off the torque limiting coupling. This occurs after transferring the locking pawl into the retaining position. Accordingly, the switching disk is moved into its freewheeling position and the driven coupling hub is retained against rotation by the locking pawl. The locking pawl is pivotably mounted on a frame of an agricultural implement. Thus, the forces are supported on the frame of the agricultural implement when stopping the coupling hub and the connected driven masses of the agricultural implement.

The torque limiting coupling according to the invention enables an emergency switching-off of the drive. The locking pawl can be released by a manually operable switch. Thus, the operating personnel can manually stop the agricultural implement in an emergency situation. Furthermore, it is possible to actuate the locking pawl by a sensor unit. The sensor observes the working area and the area of the agricultural implement. If a foreign body enters this danger area, the locking pawl is released.

Furthermore, the locking pawl ensures, via interaction with the coupling hub, that the driven masses are prevented from turning back. A turn back may occur when the torque of the coupling sleeve is reduced. Here, the spring acting in the circumferential direction causes the coupling hub to turn back while the switching disk is supported on the locking pawl. Due to this, the torque limiting coupling would again be switched on. The coupling hub would again be driven in the rotational driving direction. Further, due to the resulting relative rotation of the coupling hub to the switching disk, the torque limiting coupling would be switched off. In a low torque range this procedure would be continually repeated.

In the freewheeling position of the switching disk, the locking pawl engages with a catch lug directed to the longitudinal axis in a radial retaining groove of the coupling hub. The locking hub forms the first retaining face and a second retaining face which prevent a rotation of the coupling hub in both rotational directions.

Alternatively, in the freewheeling position of the switching disk, the locking pawl may be supported with a catch lug directed radially in the direction of the torque limiting coupling on the first retaining face of the coupling hub. Further, the locking pawl may be supported with a spring on a radial second retaining face.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
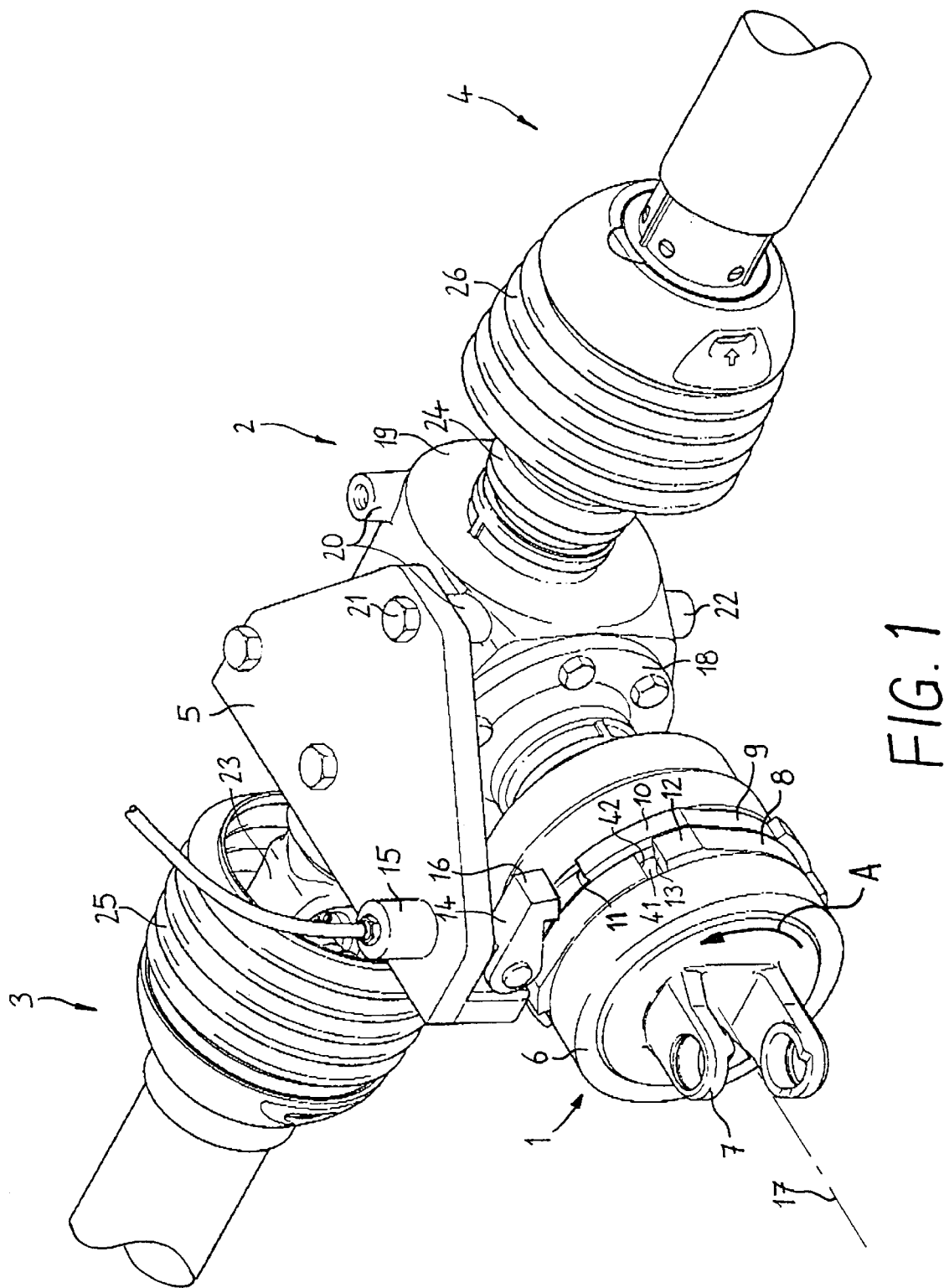
FIG. 1 is a perspective view of a torque limiting coupling according to the invention in a drive of an agricultural implement.
Figure 2:
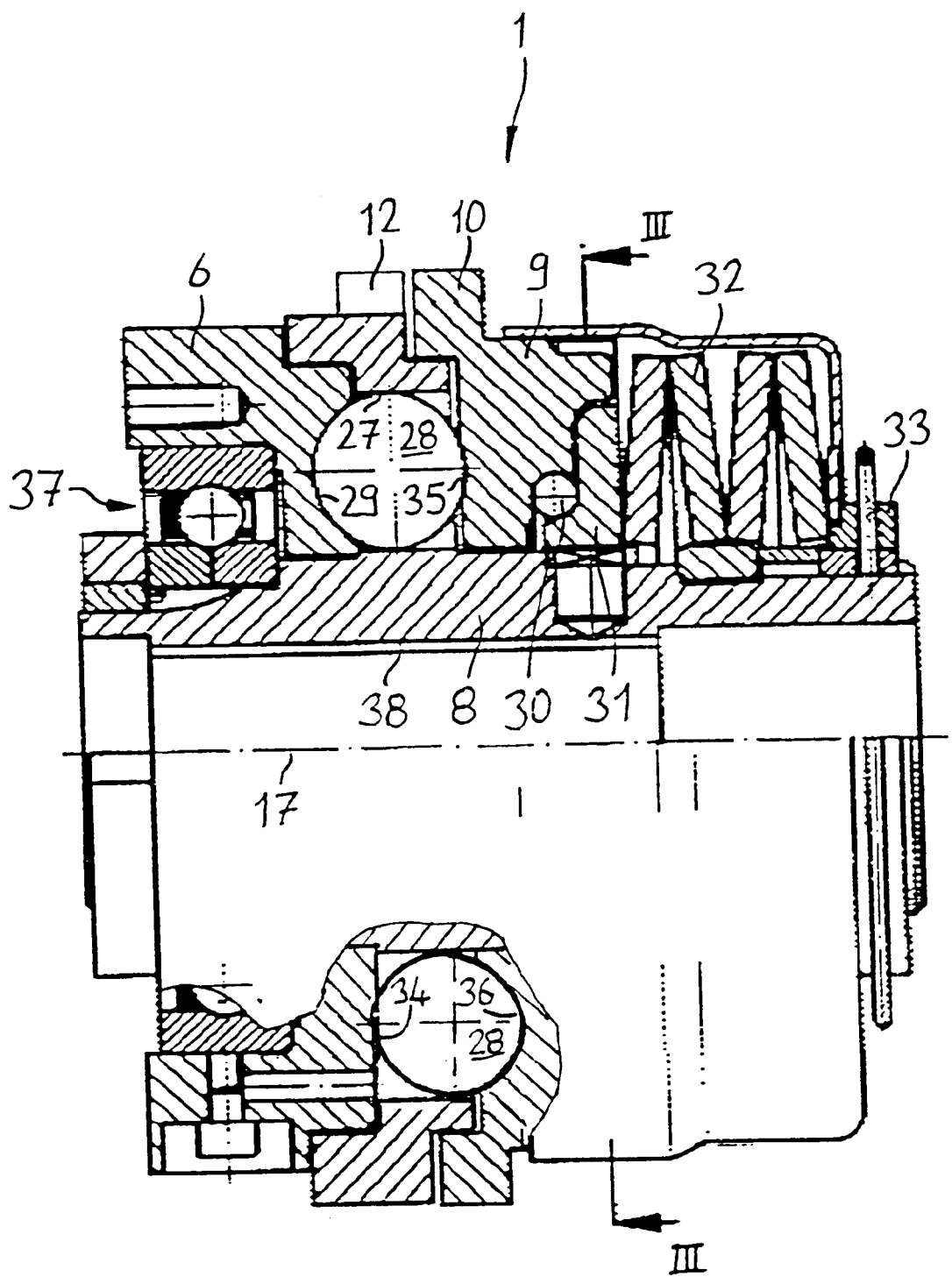
FIG. 2 is a partial longitudinal section view of the torque limiting coupling.

FIG. 1 shows, in a perspective view, a torque limiting device 1, which is identical to those of FIG. 2. The torque limiting coupling 1, drive-wise, is connected to a distributor gearbox 2. The distributor gearbox 2 is connected to a first drive shaft 3 and a second drive shaft 4 to drive an agricultural implement. An attachment element 5 is mounted on the distributor gearbox 2. The distributor gearbox can be mounted on a frame of an agricultural implement.

The torque limiting coupling 1 has a coupling sleeve 6. The coupling sleeve is stationarily connected to a joint yoke 7. The joint yoke 7 is connected to drive the torque limiting coupling 1 in a rotational driving direction (A) to a drive shaft. The coupling sleeve 6 is drivingly connected to a coupling hub 8. The drive connection between the coupling sleeve 6 and the coupling hub 8 can be interrupted when a threshold torque is exceeded.

The function of the torque limiting coupling 1 will be explained in detail by means of FIGS. 2 and 3A–C. A switching disk 9 interrupts the drive connection between the coupling sleeve 6 and the coupling hub 8. The switching disk 9 is rotated relative to the coupling hub 8. The switching disk 9 can also be rotated to switch off the torque limiting coupling 1 in a controlled manner. The switching disk 9 has a switching cam 10 which forms a radially extending switching face 11. The coupling hub 8 has a retaining cam 12 which forms a radially extending first retaining face 13.

A locking pawl 14 is mounted on the attachment element 5. The locking pawl 14 is pivotable between a release position and a retaining position. In FIG. 1, the locking pawl 14 is represented in the release position. The locking pawl 14 is adjustable by an actuating element 15 which can be mechanically, electromagnetically, hydraulically or pneumatically achievable. In the retaining position of the locking pawl 14, an abutment face 16 of the locking pawl 14 is transferred into the rotational path of the switching cam 10 and the retaining cam 12. The switching face 11 and the retaining face 13 are arranged with respect to one another such that the locking pawl 14 is moved into its retaining position. In this position, the abutment face 16 abuts the switching face 11.

The switching disk 9 is moved by rotation of the torque limiting coupling 1 in the rotational driving direction (A) into its freewheeling position. The torque transmission between the coupling sleeve 6 and the coupling hub 8 is interrupted. In this position the switching face 11 and the retaining face 13 are identical in the direction towards a longitudinal axis 17 of the torque limiting coupling 1. Thus, the abutment face 16 abuts the retaining face 13. Therefore, the coupling hub 8 is retained against rotation in the rotational driving direction (A).

As the coupling hub 8 is drivingly connected to the distributor gearbox 2 and to the first drive shaft 3 and to the second drive shaft 4, the driven masses arranged behind will also be slowed down after the retaining of the coupling hub 8. The torque limiting coupling 1 is connected to the housing 19 of the distributor gearbox by a flange connection 18. The housing 19 has bores 20 with internal threads. The fixing screws 21 are screwed into the threads to attach the attachment element 5. Furthermore, the housing 19 has attachment mechanism 22 to attach the housing 19, for example, on a frame. The attachment mechanism 22 could also be formed by bores with internal threads. A first joint yoke 23 and a second joint yoke 24 project from the housing 19. The first and second joint yokes are connected to joint yokes of the first drive shaft 3 and the second drive shaft 4. Stationary fixed protective guards 25, 26 prevent foreign bodies from entering the area of the rotating drive shafts 3, 4.

In FIG. 2 the torque limiting coupling 1 is represented in a partial longitudinal section. The torque limiting coupling is rotationally arranged around the longitudinal axis 17 and includes the coupling hub 8 and the coupling sleeve 6. The coupling hub 8 has circumferentially distributed through holes 27. Transfer elements 28, serving as rolling member bodies, are adjustably kept parallel to the longitudinal axis 17 in the through holes 27. The coupling sleeve 6 has first recesses 29 corresponding to the through holes 27. To transmit torque, the transfer elements 28 engage in the first recesses 29, as represented in FIG. 2 above the longitudinal axis 17. Here, the switching disk 9 is in a torque transmitting position and is supported axially on the transfer elements 28. On the side facing away from the transfer elements 28, the switching disk 9 is supported, via a thrust bearing 30 and a thrust collar 31, on a saucer spring packet 32. Due to the saucer spring packet 32, the switching ring 9 is forced axially against the transfer elements 28. Thus, the transfer elements 8 are held in the recesses 29. The saucer spring packet 32 is supported axially on a support ring 33. The support ring 33 is axially fixed to the coupling hub 8.

When a threshold torque is exceeded, the transfer elements 28 are pushed out of the first recesses 29 against the spring force of the saucer spring packet 32. The spring packet 32 is compressed by an axial movement of the switching disk 9 in the direction towards the saucer spring packet 32. The transfer elements 28 roll in a first groove 34 of the coupling hub 6 as well as in a second groove 35 of the switching disk 9. Due to the rolling movement of the transfer elements 28, the switching disk 9 is turned relative to the coupling hub 8 around the longitudinal axis 17. The switching disk 9 has second recesses 36 corresponding to the through holes 27. The transfer elements 28 engage the second recesses 36 in the freewheeling position of the switching disk 9. Thus, the switching disk 9 is moved due to the spring force of the saucer spring packet 32 in the axial direction towards the coupling sleeve 6. The freewheeling position of the switching disk 9 is represented in FIG. 2 below the longitudinal axis 17.

Since the transfer elements 28 do not engage in the first recesses 29 of the coupling sleeve 6, the driven coupling sleeve 6 rotates relative to the coupling hub 8. A rolling member bearing 37 is provided for this rotation. Only when the relative rotational speed between the coupling sleeve 6 and the coupling hub 8 is reduced can the switching disk 9 be transferred by the spring, acting in circumferential direction (here not represented), back to the torque transmitting position. Thus, the transfer elements 28 engage the first recesses 29 of the coupling sleeve 6.

The switching disk 9 can be transferred via the switching cam 10 of the locking pawl according to FIG. 1. The switch cam is provided on the circumference of the switching disk 9. The switching cam 10 moves from the torque transmitting position to the freewheeling position. In the freewheeling position of the switching disk 9, the locking pawl 16 abuts the retaining cam 12. The retaining cam 12 is arranged on the external circumference of the coupling hub 8.

Therefore, the coupling hub 8 is prevented from further rotation around the longitudinal axis 17. The coupling hub 8 has a bore 38, with splines, through which the coupling hub 8 is connected to the distributor gearbox according to FIG. 1. By retaining the coupling hub 8, the driven masses are also decelerated.

Figure 3A:
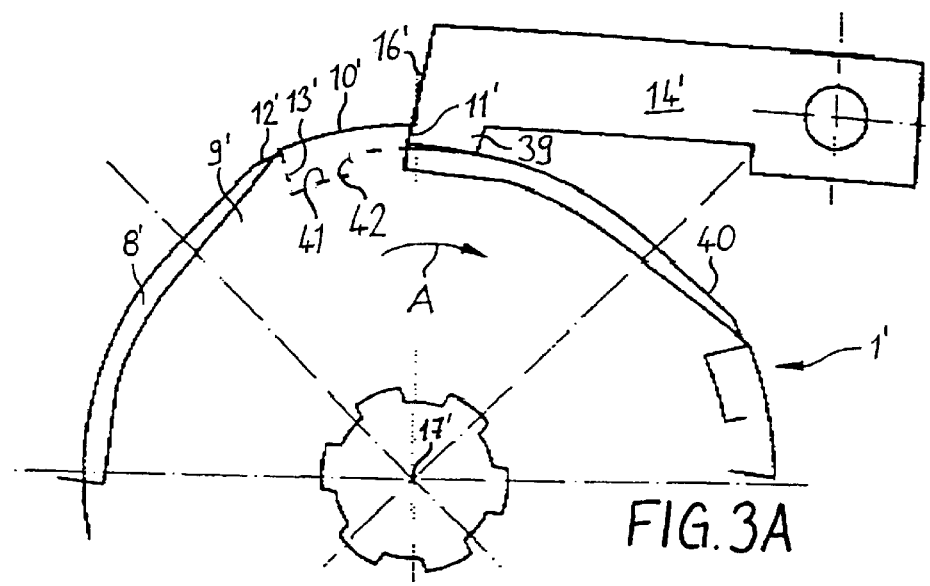
FIG. 3A is a schematical view of the torque limiting coupling in the direction of the longitudinal axis with the switching disk represented in the torque transmitting position and the locking pawl abutting the switching face.
Figure 3B:
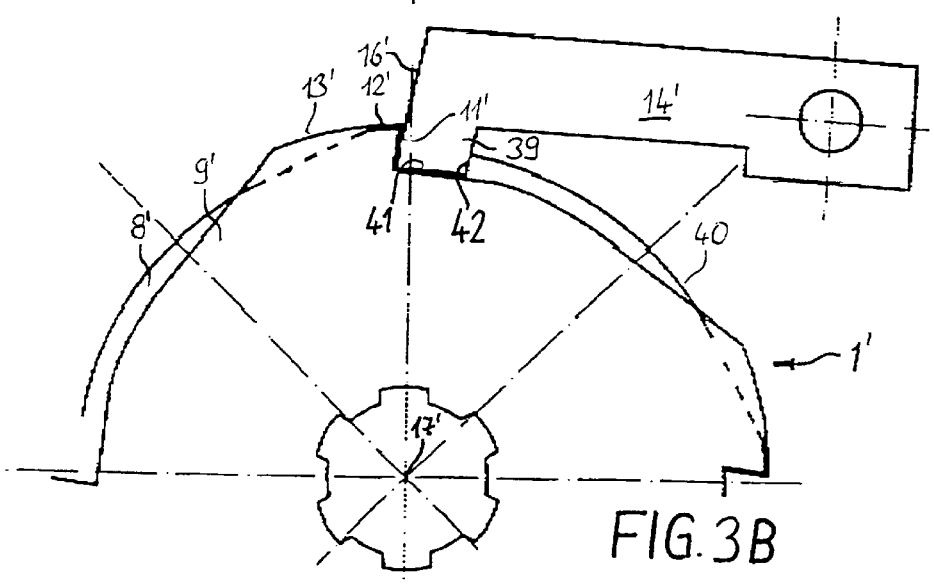
FIG. 3B is a view like 3A with the switching disk in its freewheeling position and the locking pawl in abutment to a first retaining face of the coupling hub.
Figure 3C:
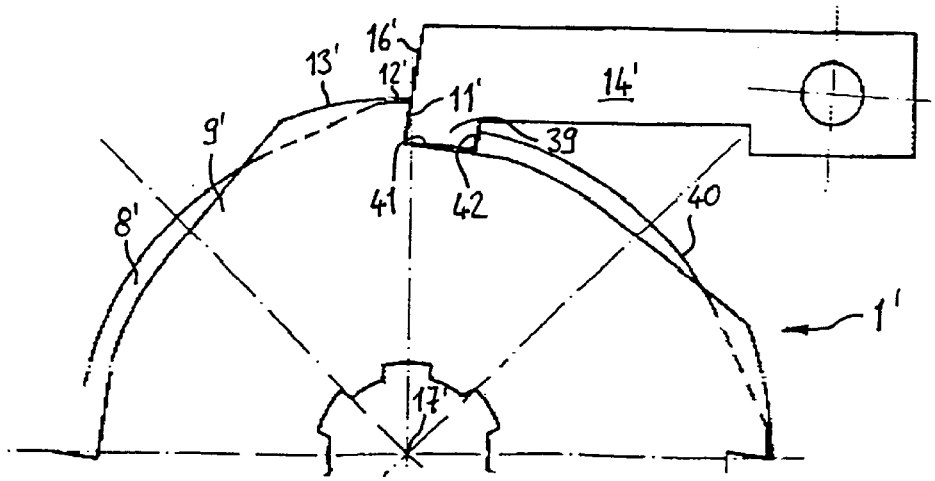
FIG. 3C is a view like 3A with a catch lug of the locking pawl engaged in a groove of the coupling hub.

FIGS. 3A to 3C show schematically the torque limiting coupling 1 according to FIGS. 1 and 2 in the view III—III of FIG. 2. Corresponding components are provided with the same reference numerals and are described in connection with FIGS. 1 and 2.

FIGS. 3A to 3C show a first alternative embodiment to retain the coupling hub. The locking pawl 14' is acted upon by a force in the direction towards its retaining position. As represented in FIG. 3A, a catch lug 39 of the locking pawl 14' is directed radially towards the torque limiting coupling 1'. The catch lug 39 abuts an external circumferential face 40 of the coupling hub 8'. The abutment face 16' abuts the switching face 11' of the switching cam 10'. During rotation of the torque limiting coupling 1', in the rotational driving direction A, the switching disk 9' is rotated relative to the coupling hub 8', until the coupling hub 8' reaches the position represented in FIG. 3B. In this position, the locking pawl 14', via its abutment face 16', abuts the first retaining face 13' of the retaining cam 12'. The coupling hub 8' is, therefore, prevented from further rotation in the rotational driving direction A. The coupling hub 8' has a radial retaining groove 41, which forms a second retaining face 42. The locking pawl 14', with the catch lug 39, can enter the retaining groove 41. Thus, the coupling hub 8' is supported with the first retaining face 13' as well as with the second retaining face 42 on the catch lug 39 of the locking pawl 14'.

Figure 4A:
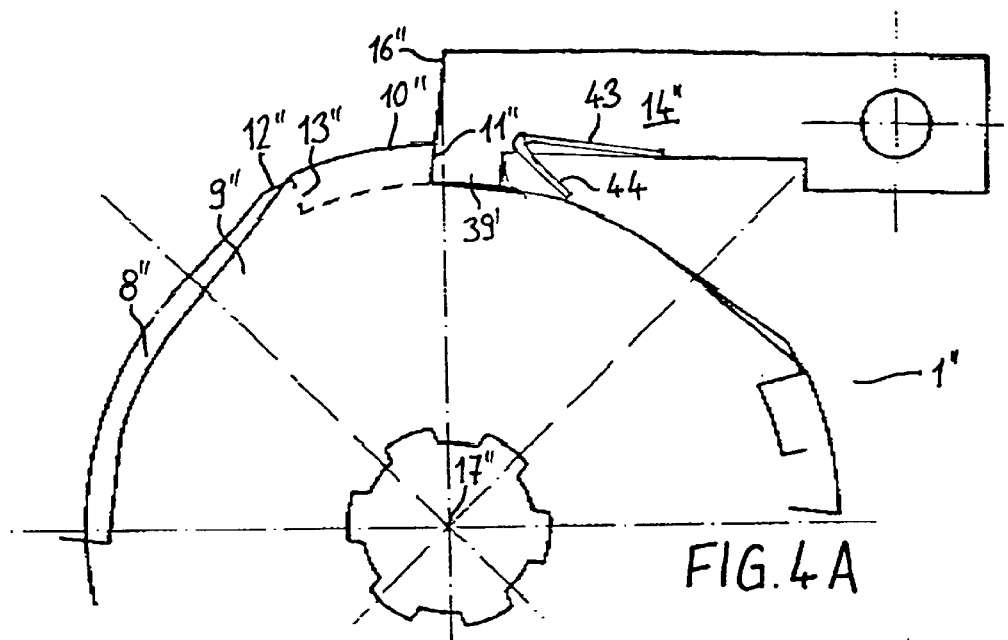
FIG. 4A is a view like FIG. 3A, where the locking pawl has a spring element.
Figure 4B:
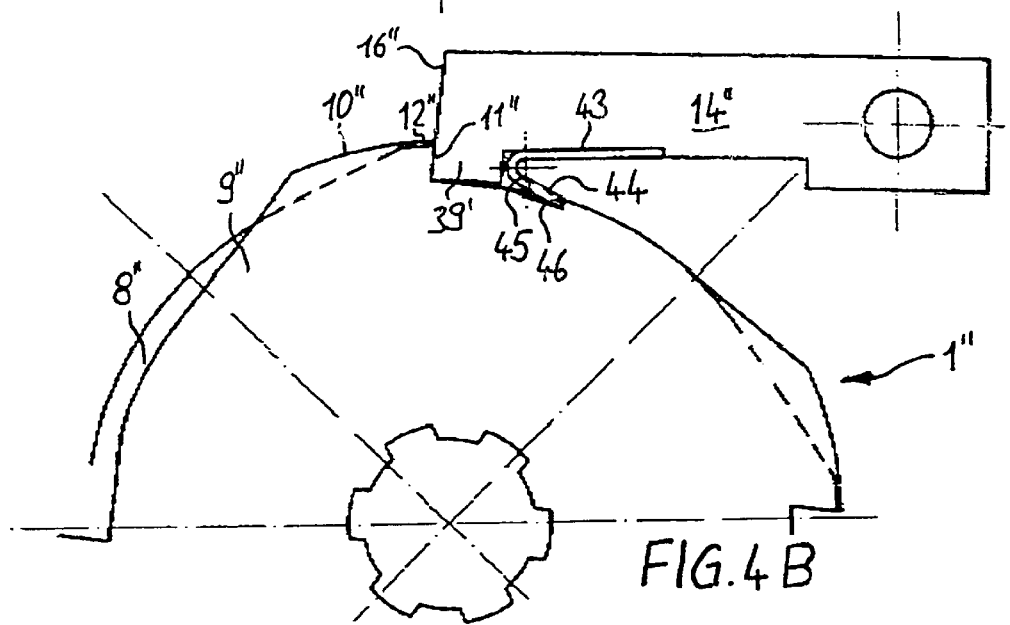
FIG. 4B is a view like FIG. 3B, where the spring element is supported on a second retaining face of the coupling hub.

FIGS. 4A to 4B show a second alternative embodiment to retain the torque limiting coupling 1". In FIG. 4A the locking pawl 14" is pushed by a force towards the retaining position. The switching face 11" of the switching cam 10" is supported on the abutment face 16" of the locking pawl 14". In the further process of rotation of the torque limiting coupling 1" in the direction of the rotational driving direction (A), the switching disk 9" is turned into the relative position to the coupling hub 8" shown in FIG. 4B. In this position the abutment face 16" abuts the first retaining face 13" of the coupling hub 8" and retains the coupling hub 8" against further rotation in the direction of the rotational driving direction A.

A spring element 43 is elastically mounted on the locking pawl 14". The spring element 43 is elastically urged in the direction towards the torque limiting coupling 1". Thus, it is acted upon towards the external circumferential face of the coupling hub 8". In the position represented in FIG. 4B, a leg 44 of the spring element 43 engages in a recess 45. The recess 45 forms a second retaining face 46 so that the coupling hub 8" is retained against rotation in both directions of rotation.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A torque limiting coupling comprising:

a longitudinal axis defined by the torque limiting coupling, said torque limiting coupling rotatable around said longitudinal axis;

a coupling hub having through holes distributed around a circumference;

transfer elements adjustably held parallel to the longitudinal axis;

a coupling sleeve driving the coupling hub in a rotational driving direction, said coupling sleeve having first recesses corresponding to said through holes;

a switching disk rotatably positioned between a torque transmitting position and a freewheeling position relative to the coupling hub;

said transfer elements urged in the direction towards the coupling hub by an axially acting spring, said transfer elements engaging the recesses of the coupling sleeve for the torque transmission;

said switching disk transferred from the torque transmitting position to the freewheeling position by said transfer elements rolling off said recesses when a predetermined nominal torque is exceeded, second recesses in said switching disk corresponding to said through holes, wherein said transfer elements engaging said second recesses in the freewheeling position;

a locking pawl movable between a releasing position and a retaining position, said locking pawl interacts in the retaining position with a radial selector face on the circumference of the switching disk such that the switching disk can be transferred from the torque transmitting position to the freewheeling position and said locking pawl interacts in the retaining position with a radially extending first retaining face of the coupling hub retained against rotation around the longitudinal axis in the rotational driving direction; and an element coupled with said locking pawl interacting in the retaining position of the locking pawl with the coupling hub such that the coupling hub is retained against a rotation opposite to the rotational driving direction.

2. The torque limiting coupling according to claim 1, wherein in the freewheeling position of the switching disk the locking pawl engages with a catch lug directed towards the longitudinal axis in a radial retaining groove of the coupling hub forming the first retaining face and a second retaining face and prevents a rotation of the coupling hub in both rotational directions.

3. The torque limiting coupling according to claim 1, wherein in the freewheeling position of the switching disk the locking pawl is supported with a catch lug directed radially in the direction to the torque limiting coupling on the first retaining face of the coupling hub and supported with a spring element on a radial second retaining face.

\* \* \* \* \*